United States Patent
Katsuda et al.

[11] Patent Number: 6,135,496
[45] Date of Patent: *Oct. 24, 2000

[54] GAS GENERATOR FOR AIR BAG AND AIR BAG SYSTEM

[75] Inventors: Nobuyuki Katsuda; Shogo Tomiyama, both of Himeji, Japan

[73] Assignee: Daicel Chemical Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,504

[22] Filed: May 16, 1997

[30] Foreign Application Priority Data

May 9, 1997 [JP] Japan .................................. 9-119548

[51] Int. Cl.[7] .................................................. B60R 21/26
[52] U.S. Cl. ........................................... 280/736; 280/741
[58] Field of Search ................................. 280/741, 736; 102/530, 531

[56] References Cited

U.S. PATENT DOCUMENTS

| | | |
|---|---|---|
| 5,269,561 | 12/1993 | Davis et al. . |
| 5,273,722 | 12/1993 | Hogenauer et al. ............... 422/164 |
| 5,507,891 | 4/1996 | Zeigler . |
| 5,551,725 | 9/1996 | Ludwig . |
| 5,642,904 | 7/1997 | Thuen et al. ........................ 280/741 |
| 5,772,242 | 6/1998 | Ueda et al. ......................... 280/741 |
| 5,876,062 | 3/1999 | Hock .................................. 280/736 |
| 6,033,500 | 3/2000 | Ito et al. . |

FOREIGN PATENT DOCUMENTS

| | | |
|---|---|---|
| 0783997 A1 | 7/1997 | European Pat. Off. . |
| 0800964 A2 | 10/1997 | European Pat. Off. . |
| 49-044434 | 4/1974 | Japan . |
| 6-183310 | 7/1994 | Japan . |
| 10-095302 | 4/1998 | Japan . |
| 9414637 A1 | 7/1994 | WIPO . |
| 9610494 A1 | 4/1996 | WIPO . |
| 9705087 A1 | 2/1997 | WIPO . |

OTHER PUBLICATIONS

*Rocket Engineering*, Nikkan Kogyo Shinbun–sha, Mar. 25, 1961 (translation provided of p. 235, lines 9–21).

*Primary Examiner*—Christopher P. Ellis
*Assistant Examiner*—Faye M. Fleming

[57] ABSTRACT

A gas generator for an air bag which enables a gas generating agent to be completely burned in a desired period of time, and shows sufficient operating characteristics is provided.

In a gas generator for an air bag, wherein igniting means to be actuated when an impact sensor detects an impact, solid bodies of gas generating agent ignited by the igniting means and burned to generate a combustion gas, and filter means for cooling the combustion gas and scavenging combustion residues are accommodated in a housing having gas discharge ports. The ratio (A/At) of the total surface area A of the solid bodies of gas generating agent to the total opening area At of the gas discharge ports is controlled to be larger than 300.

21 Claims, 6 Drawing Sheets

GAS GENERATOR FOR AIR BAG AND AIR BAG SYSTEM

FIELD OF THE INVENTION

The present invention relates to a gas generator for an air bag for protecting a passenger from an impact, and an air bag system. In particular, this invention is concerned with a gas generator for an air bag wherein the ratio (A/At) of the total surface area A of solid bodies of gas generating agent contained in a housing to the total opening area At of gas discharge ports formed through the housing is controlled to a specified range.

DESCRIPTION OF THE PRIOR ART

In a conventional gas generator for an air bag, igniting means that is actuated when an impact sensor detects an impact, a gas generating agent that is ignited by the igniting means and burned to generate combustion gas, and filter means for cooling the combustion gas and/or scavenging combustion residues are accommodated in a housing having gas discharge ports. In this type of gas generator, when the igniting means is actuated upon detection of an impact, the gas generating agent is ignited and burned to generate combustion gas. The combustion gas is cooled and purified by the filter means in the housing, and discharged from the housing through gas discharge ports. Gas generating agents used for generating the combustion gas may be roughly classified into azide-containing gas generating agents, and other gas generating agent containing no azide.

The azide-containing gas generating agent (such as $NaN_3$/CuO) has a relatively high linear burning velocity, for example, about 45–50 mm/sec under a pressure of 70 $kg/cm^2$. Accordingly, even when the gas generating agent is formed into a relatively large pellet-like shape or disc-like shape that can be maintained with high stability, the gas generating pellets or discs may be completely burned in a desired period of time, i.e., 40 to 60 msec, when used in the gas generator for an air bag installed on the side of a driver seat, for example.

On the other hand, the non-azide gas generating agent generally has a linear burning speed of 30 mm/sec or lower. If this gas generating agent is formed into a pellet-like shape with a diameter of 2 mm, or a disc-like shape with a thickness of 2 mm, for example, the shape of the gas generating pellet or disc can be maintained with high stability, but it takes as much as about 100 msec to burn the gas generating agent where its linear burning velocity is about 20 mm/sec, which is longer than a desired burning time of 40 to 60 msec. Where the linear burning velocity is around 20 mm/sec, the diameter of the gas generating pellet or the thickness of the gas generating disc must be controlled to be around 1 mm to achieve a desired burning time. Where the linear burning velocity is 10 mm/sec or lower, the thickness of the gas generating pellet or disc must be reduced to 0.5 mm or smaller. It is, however, practically impossible to produce pellets or discs of the gas generating agent having such diameter or thickness, which can withstand vibrations of an automobile for a long period of time, while being held in an industrially stable condition. The gas generator containing such gas generating pellets or discs does not perform its functions satisfactorily. Thus, it has been difficult to develop a gas generator that contains a non-azide gas generating agent and can be advantageously used in practical applications.

SUMMARY OF THE INVENTION

It is, therefore, an object of the present invention to provide a gas generator for an air bag which permits its gas generating agent to be completely burned within a desired period of time, and also shows satisfactory operating characteristics.

Since the maximum pressure in the housing upon actuation of the gas generator varies with the temperature of the outside air or atmosphere, it is difficult to provide a gas generator for an air bag which exhibits stable operating characteristics, and does not substantially depend upon the temperature of the atmosphere.

It is, therefore, another object of the present invention to provide a gas generator for an air bag which can be manufactured at a reduced cost, and which is able to operate with high stability, without depending upon the temperature of the atmosphere.

The gas generator for an air bag according to the present invention is characterized in that the ratio (A/At) of the total surface area A of solid bodies of gas generating agent stored in a housing to the total opening area At of gas discharge ports formed through the housing is controlled to a specified range.

More specifically, in the gas generator for an air bag of the present invention, wherein igniting means that is actuated when an impact sensor detects an impact, a gas generating agent that is ignited by the igniting means and burned to generate combustion gas, and filter means for cooling the combustion gas and scavenging combustion residues are accommodated in a housing having gas discharge ports, the ratio (A/At) of the total surface area A of solid bodies of the gas generating agent to the total opening area At of the gas discharge ports is controlled to be larger than 300.

With the ratio (A/At) of the total surface area A of the gas generating agent to the total opening area At of the gas discharge ports being controlled to be larger than 300, a difference between maximum output pressures at 85° C. and 20° C. and a difference between maximum output pressures at 20° C. and −40° C. in tank pressure tests are respectively not higher than 40 kPa. In the gas generator for an air bag to be used for a driver seat side and a passenger seat side, the ratio (A/At) of the total surface area A of the gas generating agent to the total opening area At of the gas discharge ports may be controlled to be larger than 300, but not larger than 1300, and preferably controlled to be in a range of 450 to 1300, more preferably, in a range of 450 to 1000.

The above-explained housing may be formed by casting or forging, or may be formed by pressing a diffuser shell having gas discharge ports through which the gas generated by burning the gas generating agent is discharged, and a closure shell having a central aperture in which the igniting means is disposed, and joining these shells together by various welding methods, such as plasma welding, friction welding, projection welding, electron beam welding, laser welding and TIG welding. The housing thus formed by press working can be easily manufactured at a reduced cost. Each of the diffuser shell and closure shell may be formed from a stainless steel sheet having a thickness of 1.2 to 3.0 mm, for example. The volume content of the housing is desirably in the range of 60 to 130 cc. The gas discharge ports formed through this housing are desirably circular holes, each having an inside diameter of 2 to 5 mm, and the total opening area of these discharge ports is desirably in a range of 50 to 200 $mm^2$ where the gas generator is used for an air bag for a driver seat side, and in a range of 60 to 500 $mm^2$ where the gas generator is used for an air bag for a passenger seat side.

The gas discharge ports of the housing are preferably closed by an aluminum tape having a width that is 2 to 3.5 times the diameter of each discharge port, for inhibiting entry of moisture from the exterior space into the housing. The aluminum tape may be an adhesive aluminum tape, or may be attached to the housing by means of various kinds of adhesives, such as those that are fused by heat to provide secure bonding. For example, a hot melt adhesive may be used to attach the aluminum tape to the housing.

The gas generating agent is more effectively used in the present gas generator particularly when its linear burning velocity is in the range of 7 to 30 mm/sec, preferably 7 to 15 mm/sec, under a pressure of 70 kg/cm$^2$. The gas generating agent having such a property may be a non-azide gas generating agent containing a nitrogen containing organic compound, an oxidizing agent, and a slag-forming agent, for example. The content of the nitrogen containing compound in the gas generating agent may be in the range of 25 to 60% by weight, and the content of the oxidizing agent may be in the range of 40 to 65% by weight, while the content of the slag-forming agent may be in the range of 1 to 20% by weight.

The nitrogen containing compound serves as a fuel and a nitrogen source. Such a nitrogen containing compound may be selected from those containing tetrazole, triazole, or a nitrogen containing organic compound of these metallic salts or the like, and an oxygen containing oxidizing agent, such as alkali metal nitrate, as major components, and triaminoguanidine nitrate, carbohydrazide, nitroguanidine and others. In the present invention, nitroguanidine is particularly preferred. The content of the nitrogen containing compound in the gas generating agent may be generally in the range of 25 to 60% by weight, preferably, in the range of 30 to 40% by weight, though it varies depending upon the number of carbon elements, hydrogen elements and other oxidized elements in its molecular formula. Although the absolute value of the content of the nitrogen containing compound differs depending upon the type of the oxidizing agent used, minor CO concentration in the generated gas increases as the absolute value is larger than the complete oxidation theoretical value, and minor NOx concentration in the generated gas increases as the absolute value is equal to or smaller than the complete oxidation theoretical value. Accordingly, the content of the nitrogen containing compound is most preferably controlled in the range in which these concentrations are optimally balanced.

The slag-forming agent in the gas generating composition functions to convert a liquid form of an oxide of alkali metal or alkali earth metal particularly produced by decomposition of the oxidizing agent in the gas generating composition, into a solid form, so as to retain the oxide in the combustion chamber and thus prevent the oxide in the form of mist from being discharged out of the inflator. The optimum slag-forming agent may be selected to be suited for the metallic component to be converted into the solid form. The slag-forming agent may be formed of at least one kind selected from natural clays containing aminosilicate as a major component, such as those of bentonite and kaolin, and artificial clays, such as synthetic mica, synthetic kaolinite, and synthetic smectite, and talc as one kind of minerals of water-containing magnesium silicate. In the present invention, acid clay may be preferably used as the slag-forming agent. The content of the slag-forming agent in the gas generating agent may vary from 1 to 20% by weight, and is preferably in the range of 3 to 7% by weight. If the content of the slag-forming agent is too large, the linear burning velocity is reduced, with a result of reduction in the gas generating efficiency. If the content is too small, the slag-forming agent cannot sufficiently fulfill its slag-forming function.

The oxidizing agent may be selected from nitrates of alkali metals or alkali earth metals, chlorates, and perchlorates, as well known in the art. In particular, the oxidizing agent preferably comprises at least one kind selected from nitrates of alkali metals or alkali earth metals, which contain cation. For example, strontium nitrate is preferably used. Although the absolute value of the content of the oxidizing agent in the gas generating agent varies depending upon the kind and amount of the gas generating compound used, it is preferably in the range of 40 to 65% by weight, in particular, in the range of 45 to 60% by weight in view of the CO and NOx concentrations as described above.

The gas generating agent may further contain a selected one of various known binders, where the gas generating agent is formed into a certain shape to provide solid bodies.

The gas generating agent may be formed into a cylindrical shape with a single hole, and in this case, the surface area of each body of the gas generating agent can be increased. To enable the gas generating agent to be completely burned within a desired burning time, the smallest thickness of the cylindrical wall of the gas generating body is preferably controlled to 0.01–2.5 mm, more preferably, 0.01 to 1.0 mm. Where this thickness is 0.85 mm, for example, the cylindrical gas generating body with a single hole may have an outside diameter of 2.5 mm and an inside diameter of 0.8 mm. Where the thickness is 1.2 mm, the cylindrical gas generating body with a single hole may have an outside diameter of 3.2 mm and an inside diameter of 0.8 mm.

The amount of the gas generating agent contained in the gas generator is preferably in a range of 20 to 50 g where the gas generator is to be used for an air bag for a driver seat side, and in a range of 50 to 190 g where the gas generator is to be used for an air bag for a passenger seat side.

Where the gas generating agent contained in the housing is a non-azide type gas generating agent, it has a linear burning velocity of 5 to 30 mm/sec under a pressure of 70 kg/cm$^2$. When this gas generating agent is used in gas generators for air bags installed on an automobile, the gas generating agent needs to be completely burned in 40 to 60 msec to inflate an air bag for a driver seat side, and in 50 to 80 msec to inflate an air bag for a passenger seat side. To control combustion of the gas generating agent, therefore, the ratio (A/At) of the total surface area A of solid bodies of the gas generating agent to the total opening area At of the gas discharge ports is controlled to be larger than 300. In the gas generator for air bags used on the side of the driver seat and passenger seat, this ratio A/At may be controlled to be larger than 300 but not larger than 1300, and preferably controlled to be in the range of 450 to 1300, more preferably, in a range of 450 to 1000. In this case, the gas generating agent can be completely burned in the above-indicated period of time.

If the ratio A/At exceeds the maximum value, the pressure in the gas generator excessively increases, and the burning velocity of the gas generating agent becomes excessively high. If the ratio A/At is less than the minimum value, on the other hand, the pressure in the gas generator is lowered, and the burning velocity becomes excessively low. In either case, the burning time of the gas generating agent is outside the desired range, and an operable gas generator cannot be provided.

When the ratio (A/At) of the total surface area A of the gas generating agent to the total opening area At of the gas discharge ports is controlled as described above, a difference between maximum pressures at 85° C. and 20° C. and a difference between maximum pressures at 20° C. and −40°

C. in tank pressure tests are respectively not higher than 40 kPa. Thus, the maximum pressure in the housing upon actuation of the gas generator does not depend upon the temperature of the atmosphere, and the gas generator for an air bag according to the present invention exhibits stable operating characteristics.

In the tank pressure test, the gas generator containing the shaped bodies of gas generating agent is fixed to the inside of a tank made of SUS (stainless steel: according to Japanese Industrial Standard) and having a content volume of 60 liters. After the tank is air-tightly closed, the gas generator is connected to an external ignition circuit. By using a pressure transducer installed in the tank, pressure increases or changes in the tank are measured from time 0 to 200 milliseconds where the time 0 indicates a point of time when the switch of the ignition circuit is turned on. Measurement data are processed by a computer, and finally represented as a tank pressure/time curve from which operating characteristics of the gas generator can be evaluated. In this test, a portion of the gas in the tank may be sampled out after the combustion, to be analyzed in respect of its CO and NOx components, for example. According to the present invention, the tank pressure tests are conducted at −40° C., 20° C., and 85° C., to obtain the maximum output pressure (namely, maximum tank pressure) from the tank pressure/time curve at each temperature, and the difference between the maximum pressures in the tank pressure tests at 85° C. and 20° C. and the difference between the maximum output pressures in the tank pressure tests at 20° C. and −40° C. are calculated.

The filter means removes combustion residues produced by combustion of the gas generating agent, and cools the combustion gas. As the filter means having these functions, a conventionally used filter for purifying the generated gas and/or a coolant for cooling the generated gas may be used, or a layered wire screen filter or the like may be used which is obtained by compressing wire screens formed of a suitable material into an annular layered structure. This layered wire screen filter may be formed by superposing some layers of plain-stitch wire mesh screens in radial directions, and compressing the wire screens in the radial and axial directions into an annular shape. The filter means thus formed has a complicated porous structure, and provides an excellent scavenging effect. Thus, the filter means provides a coolant/filter unit having both cooling and scavenging functions. More specifically, a plain-stitch wire screen made of a stainless steel is formed into a cylindrical body, and one end portion of this cylindrical body is repeatedly bent outward to form an annular layered body, which is then compressed in a mold to form the filter means. In another method, a plain-stitch wire screen or mesh sheet made of stainless steel may be formed into a cylindrical body, and the cylindrical body is pressed in a radial direction and formed into a planar body, which is then rolled cylindrically many times into a multi-layered body. This layered body is then compressed in a mold to thus form the filter means. The stainless steel used as a material for the wire screens may be selected from SUS 304, SUS 310S, SUS 316 (according to Japanese Industrial Standard). In particular, SUS 304 (18Cr-8Ni-0.06C), which is austenitic stainless steel, shows excellent corrosion resistance.

The filter means may have a dual-layer structure having an inner or outer layer consisting of the layered wire-screen body. The inner layer may have a function of protecting the filter means from the combustion gas generated by combustion of the gas generating agent. The outer layer may have functions to prevent the filter means from swelling or expanding out due to the gas pressure upon actuation of the gas generator, and closing a space formed between the filter means and an outer circumferential wall of the housing. Where the filter means is spaced apart from the inner circumferential surface of the housing, namely, where the space is formed between the outer circumferential surface of the filter means and the inner circumferential surface of the housing, this space functions as a gas passage, which permits the combustion gas to pass through the entire region of the filter means such that the gas is effectively cooled and purified during the passage.

The terms "coolant/filter" and/or "coolant-filter" used herein refer to a filter means which both cools combustion gases and scavenges residues therefrom.

The gas generator for an air bag according to the present invention may employ any type of system for sensing an impact and actuating the igniting means provided that the gas generator is constructed as described above. Namely, the impact sensing and igniting system may be of a mechanical ignition type in which the ignition means is actuated only by a mechanical arrangement to generate gas when an impact sensor detects an impact, or may be of an electric ignition type in which the igniting means is actuated in response to an electric signal transmitted from an impact sensor upon detection of an impact, to generate gas.

In the mechanical ignition type gas generator using mechanical igniting means, a mechanical sensor for sensing an impact only by a mechanical arrangement, for example, a sensor adapted to launch a plunger upon movement of a weight, is mounted in the housing. This housing is formed with a plurality of gas discharge ports, and incorporates a detonator that is ignited and burned when the plunger launched by the mechanical sensor enters the detonator, igniting means comprising a transfer charge that is ignited and burned by the flame of the detonator, gas generating means that is ignited and burned by the flame of the transfer charge to generate gas, and filter means for cooling and purifying the generated gas. In the electric ignition type gas generator using electrical igniting means, on the other hand, the housing having gas discharge ports incorporates igniting means comprising an igniter to be actuated in response to an electric signal transmitted from a sensor upon detection of an impact, a transfer charge that is ignited and burned upon actuation of the igniter, gas generating means that is ignited and burned by a flame produced by the transfer charge to generate gas, and filter means for cooling and purifying the generated gas. The gas generator of mechanical ignition type or electric ignition type may employ a suitably selected structure other than the above, which is advantageous in the operating characteristics.

The gas generator of the present invention may include elements other than those indicated above, provided that the ratio (A/At) of the total surface area A of the solid bodies of the gas generating agent installed in the said housing to the total opening area At of the gas discharge ports is controlled as described above. For instance, the gas generator may employ a perforated cylindrical plate that surrounds the outer periphery of the filter means to inhibit deformation of the filter means, and short-pass preventing means (plate members etc.) for surrounding the upper end and/or lower end of the inner periphery of the filter means to inhibit the generated gas from short-passing through a clearance between the filter means and an inner surface of the housing. The gas generator may also include a perforated basket having a cylindrical shape and many holes, which surrounds the inner periphery of the filter means to prevent direct contact between the gas generating means and the filter means.

The gas generator for an air bag, as described above, and the air bag that is inflated by the gas generated by the gas generator are accommodated in a module case, to provide an air bag system. This air bag system further includes an impact sensor for detecting an impact to actuate the gas generator. If the gas generator is of a mechanical ignition type, the impact sensor consists of a mechanical sensor, and is stored in the housing, along with the igniting means. If the gas generator is of electric ignition type, on the other hand, the impact sensor may consist of a semiconductor acceleration sensor disposed outside a console box, for example. In this semiconductor type acceleration sensor, four semiconductor strain gauges are formed on a beam of a silicon substrate that is adapted to deflect upon application of acceleration, such that these strain gauges are connected in a bridge form. The beam is deflected upon application of acceleration thereto, and strains occur on the surface of the beam. The resistance of the semiconductor strain gauges changes due to the strains, and the changes in the resistance are detected as voltage signals that are proportional to the applied acceleration. Where the electric ignition type gas generator is used, in particular, the air bag system may also include a control unit provided outside the module case. This control unit is provided with an ignition determining circuit, which receives signals from the semiconductor type acceleration sensor. At the point of time when the impact signal from the impact sensor exceeds a given value, the control unit starts computing, and generates an actuation signal to the gas generator when the result of computing exceeds a given value.

In this air bag system, the gas generator is actuated in association with sensing of an impact by the impact sensor to discharge the combustion gas through its gas discharge ports. The combustion gas is expelled into the air bag, so as to inflate the air bag while breaking the module cover, so that the inflated air bag forms a cushion between a hard structure in the vehicle and a passenger.

DESCRIPTION OF THE PREFERRED EMBODIMENTS

Figure 1:
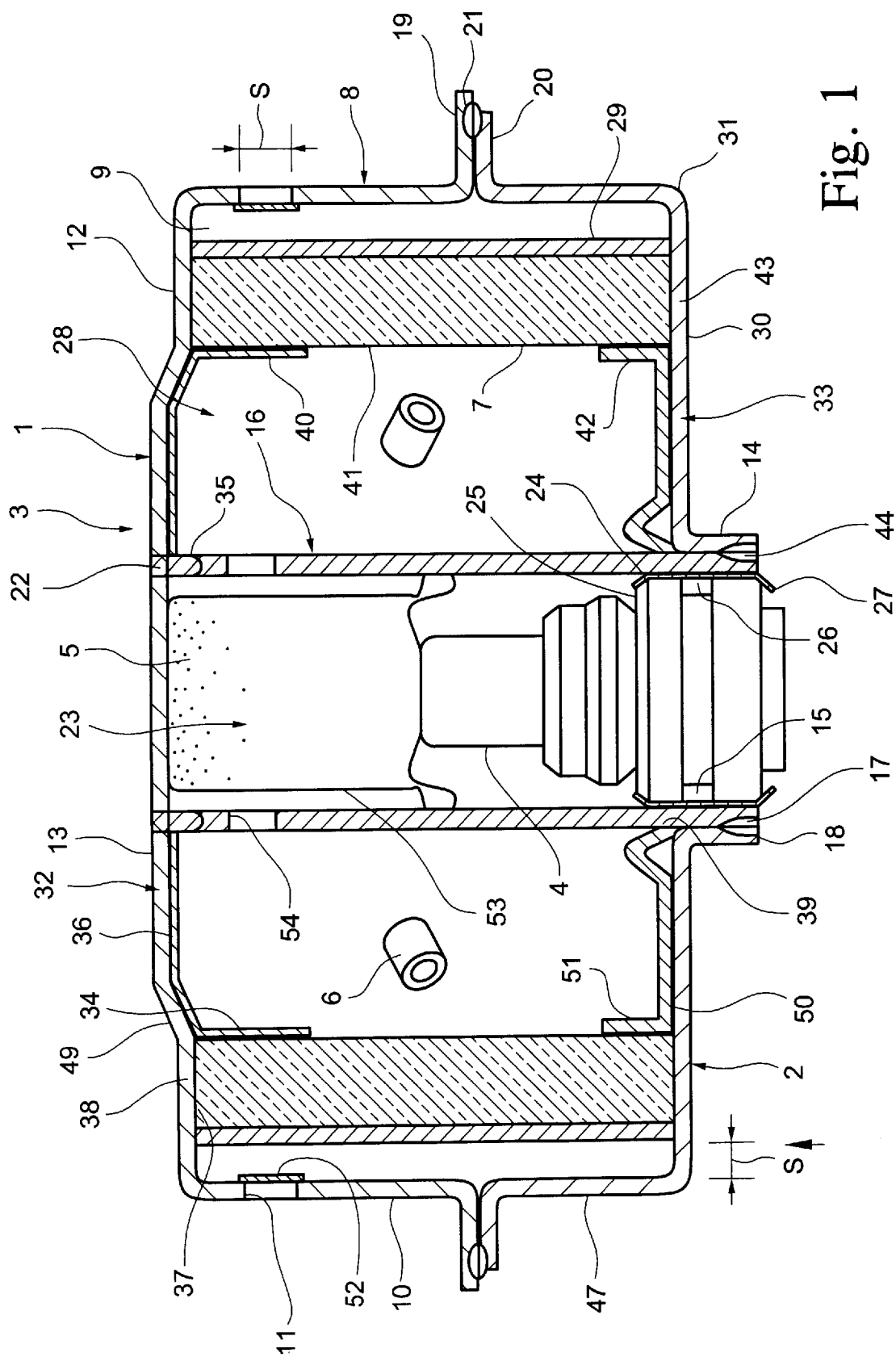
FIG. 1 is a cross sectional view showing a gas generator according to one embodiment of the present invention.

Referring to the drawings, preferred embodiments of the present invention will be hereinafter described.

Figure 2:
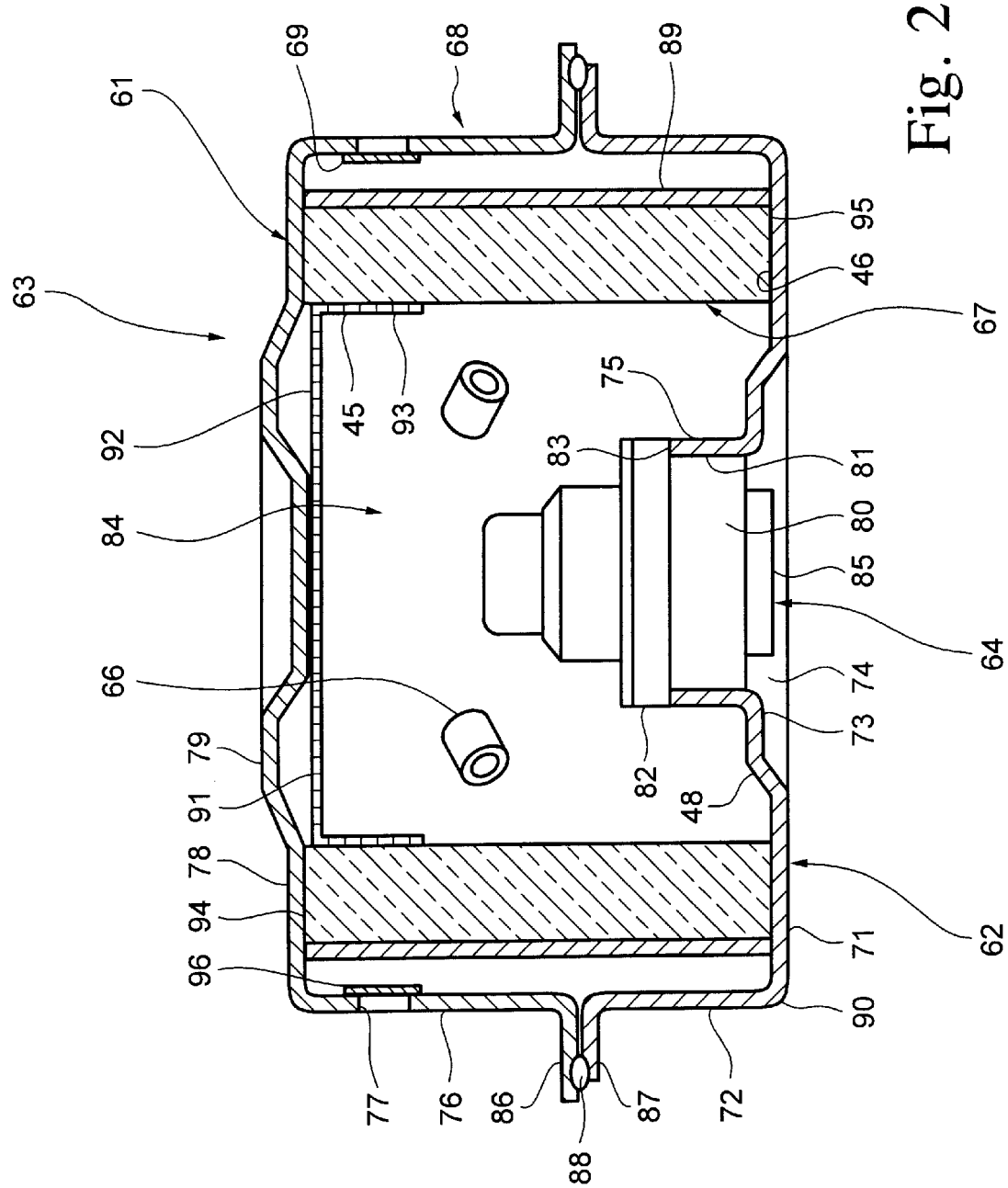
FIG. 2 is a cross sectional view showing a gas generator according to another embodiment of the present invention.

FIG. 1 and FIG. 2 show gas generators for air bags used on the side of a driver seat. FIG. 1 is a cross sectional view showing a gas generator for an air bag according to the present invention. The present gas generator includes a housing 3 having a diffuser shell 1 and a closure shell 2, igniting means, i.e., an igniter 4 and a transfer charge 5, provided in a storage space in this housing 3, a gas generating agent 6 that is ignited by the igniting means to generate combustion gas, and filter means, i.e., a coolant/filter 7, which defines a combustion chamber 28 for storing the gas generating agent 6.

The diffuser shell 1 is formed by pressing a stainless steel sheet, and has a circular portion 12, a circumferential wall portion 10 formed at the outer periphery of the circular portion 12, and a flange portion 19 formed at the distal end of the circumferential wall portion 10 to extend radially outward from this portion 10. In the present embodiment, sixteen 3 mm-diameter gas discharge ports 11 (the total opening area of the gas discharger ports At=113 $mm^2$) are formed through the circumferential wall portion 10, such that these discharge ports 11 are equally spaced apart from each other in the circumferential direction. This diffuser shell 1 includes an inclined portion 49 which provides an outwardly protruding circular portion 13 formed in a middle part of the circular portion 12. This inclined portion 49 serves to increase the rigidity of the housing, in particular, of the circular portion 12 of the diffuser shell that forms a ceiling portion of the housing, and also serves to increase the volume of the storage space of the housing. A transfer charge container 53 for storing the transfer charge 5 is sandwiched between the protruding circular portion 13 and the igniter 4.

The closure shell 2 is formed by pressing a stainless steel sheet, and has a circular portion 30, central aperture 15 formed through a central portion of the circular portion 30, a circumferential wall portion 47 formed at the outer periphery of the circular portion 30, and a flange portion 20 formed at the distal end of the circumferential wall portion 47 to extend radially outwards from this portion 47. The central aperture 15 is defined by an axial bent portion 14 of the closure shell 2 which extends from the circular portion 30 in the axial direction. This bent portion 14 serves to increase the rigidity of the peripheral portion of the central aperture 15, and provides a relatively large surface to be joined to a central cylindrical member 16. The central cylindrical member 16 is fitted in this central aperture 15, such that one of opposite end faces 17 of the central cylindrical member 16 is flush with an end face 18 of the bent portion 14.

The diffuser shell 1 and closure shell 2 are joined together by superposing the flange portion 19 of the diffuser shell 1 and the flange portion 20 of the closure shell 2 at an axially middle position of the housing 3 and performing a laser welding 21 to form the housing 3. These flange portions 19, 20 serve to increase the rigidity of the housing 3, in particular, its outer circumferential wall 8, thereby preventing deformation of the housing due to the pressure of the generated gas.

The central cylindrical member 16 is made of a stainless steel tube which is open at both ends, and fixed at one end to the protruding circular portion 13 of the diffuser shell 1 by electron beam welding 22. An ignition means storage chamber 23 is formed inside this central cylindrical member 16, and the igniter 4 and the transfer charge container 53 are disposed within the igniting means storage chamber 23. The igniter 4 is actuated in response to a signal from a sensor (not shown), and the transfer charge 5, filling the transfer charge container 53, is ignited or fired by the igniter 4. The central cylindrical member 16 has a holding member 24 for holding the igniter 4, and this holding member 24 consists of an inward flange portion 25 for limiting axial movement of the igniter 4, a cylindrical portion 26 in which the igniter 4 is fitted and which is fixed to the inner circumferential surface of the central cylindrical member 16, and a crimped portion 27 formed by crimping, which cooperates with the inward flange portion 25 to fix the igniter 4 in place in the axial direction. The central cylindrical member 16 also has through-holes 54 formed in one end portion thereof remote from the holding member 24. In the present embodiment, six through holes 54, having a diameter of 2.5 mm, are formed at regular intervals in the circumferential direction.

The central cylindrical member 16 is formed by rolling a stainless steel sheet into a tube. In the case of an electric ignition type gas generator, the central cylindrical member 16 is formed by rolling a stainless steel sheet having a thickness of 1.2 to 3.0 mm into a tubular shape, and welding its joint portion to form a tube having an outside diameter of 17 to 22 mm. In the case of a mechanical ignition type gas generator, the central cylindrical member 16 is formed by rolling a stainless steel sheet having a thickness of 1.5 to 7.0 mm into a tubular shape, and welding its joint portion to form a tube having an outside diameter of 19 to 30 mm. Such a welded tube may be formed by a UO press method (in which a sheet is formed into U shape, and then into O shape, followed by welding of its joint), or formed as an electric resistance welded tube (obtained by forming a sheet into a circular shape, and welding its joint under pressure with a large current flowing through it while generating resistance heat).

The coolant/filter 7 is disposed so as to surround the gas generating agent 6, and defines an annular chamber, namely, a combustion chamber 28, around the central cylindrical member 16. This coolant/filter 7 is formed by superposing some layers of plain-stitch wire screens made of stainless steel in the radial direction, and compressing the wire screens in the radial and axial directions. In this coolant/filter 7, each layer has a loop-like mesh that is squashed or pressed out of shape, and such layers are laminated on top of another in the radial direction. Thus, the coolant/filter 7 has a complicated porous structure, and provides an excellent scavenging effect. An outer layer 29 consisting of a layered wire net structure is formed outside the coolant/filter 7. This outer layer 29 serves as means for preventing the coolant/filter 7 from swelling or expanding into a space 9 due to the gas pressure upon actuation of the gas generator, so that the space 9 is not closed by the coolant/filter 7. This outer layer 29 also has a cooling function. The coolant/filter 7 defines the combustion chamber 28, and serves to cool the combustion gas generated in the combustion chamber 28 while scavenging or entrapping combustion residues.

The closure shell 2 includes an inclined portion 31 formed in the circumferential direction so as to surround its circular portion 30. This inclined portion 31 inhibits radial movement of the coolant/filter 7, and also functions to form the space between the outer circumferential wall 8 of the housing and the coolant/filter 7.

A large number of solid bodies of gas generating agent 6 are provided in the combustion chamber 28. Each body of the gas generating agent 6 has a hollow, cylindrical shape, which is advantageous in that combustion takes place at its outer surface and inner surface at the same time, and thus the overall surface area of the gas generating agent 6 does not significantly change as the combustion progresses. In the present embodiment, the gas generating agent contains 25 to 60% by weight of nitroguanidine, 40 to 65% by weight of strontium nitrate, and 1 to 20% by weight of acid clay, and is formed into a hollow cylindrical shape having an outside diameter of 2.4 mm, inside diameter of 0.8 mm, and a length of 2 mm. The combustion chamber 28 of the housing is filled with 37 g of the gas generating agent (having a linear burning velocity of 11 mm/sec, the total surface area of the gas generating agent bodies: $A=56804$ mm$^2$).

Plate members 32, 33 are provided at the upper end portion and lower end portion of the coolant/filter 7, respectively. The plate member 32 has a circular portion 36 closing an opening 40 at the upper end portion of the coolant/filter 7, and a circumferential portion 34 formed integrally with the circular portion 36 and abutting on an inner circumferential surface 41 of the coolant/filter 7. The circular portion 36 has a central aperture 35 fitting on the outer periphery of the central cylindrical member 16. The circumferential wall portion 34 is opposed to the through-holes 54 through which a flame is ejected from the igniting means, and covers the inner circumferential surface 41 of the coolant/filter 7 facing the through-holes 54. This circumferential wall portion 34 prevents the coolant/filter 7 from being damaged by the flame ejected toward the coolant/filter 7, and also changes the direction of the ejected flame so that the flame is sufficiently circulated through the gas generating agent 6. The plate member 32 is fixed to the central cylindrical member 16 which limits radial movement of the plate member 32, and thus serves as means for positioning the coolant/filter 7 during assembly of the gas generator. The plate member 32 also functions as short-pass preventing means for preventing the combustion gas from short-passing through a clearance between an inner surface 37 of the housing and an end face 38 of the coolant/filter 7, which clearance may appear due to the pressure of the combustion gas upon actuation of the gas generator.

The plate member 33 has a circular portion 50 for closing an opening 42 at the lower end portion of the coolant/filter 7, and a circumferential wall portion 51 formed integrally with the circular portion 50 and abutting on the inner circumferential surface 41 of the coolant/filter 7. The circular portion 50 has a central aperture 39 fitted on the outer periphery of the central cylindrical member 16, and is in contact with the solid bodies of gas generating agent 6 to prevent movement of these gas generating bodies. The plate member 33 is gripped or held by resilient force between the central cylindrical member 16 and the coolant/filter 7, and prevents the combustion gas from passing along an end face 43 of the coolant/filter 7 opposite to the above-indicated end face 38. The plate member 33 also functions as a welding protective plate during welding.

A space 9 is formed between the outer circumferential wall 8 of the housing and the outer layer 29 of the coolant/filter 7. With the space 9 thus provided, an annular gas passage is formed around the coolant/filter 7 as viewed in a radial cross section. The area St of the gas passage as measured in the radial cross section is made larger than the sum At of opening areas S of the gas discharge ports 11 of the diffuser shell. In the presence of the gas passage around the coolant/filter 7, the combustion gas passes through the entire region of the coolant/filter 7, to be directed toward the gas passage, thereby achieving efficient use of the coolant/filter 7 and effective cooling and purification of the combustion gas. The combustion gas thus cooled and purified by the coolant/filter 7 reaches the gas discharge ports 11 of the diffuser shell 1, through the gas passage as described above.

An aluminum tape 52 is attached to the diffuser shell 1 to close the gas discharge ports 11, to inhibit entry of moisture from the exterior space into the housing 3.

In the gas generator of the present embodiment, the ratio (A/At) of A to At is 502, where A (56804 mm$^2$) is the sum of surface areas or total surface area of the solid bodies of gas generating agent 6, and At (113 mm$^2$) is the total opening area of the gas discharge ports 11 of the diffuser shell 1. This ratio A/At is generally controlled to be in the range of 450 to 1000. With the ratio A/At thus controlled, the burning velocity of the gas generating agent is controlled to be suited for air bags for driver seats side, and the gas generating agent mounted in the present gas generator can be completely burned within a desired period of time. Also, the present gas generator is less likely to be influenced by changes in the temperature of the atmosphere, thus assuring stable operating characteristics.

In assembling the gas generator of the present embodiment, the diffuser shell 1, to which the central cylindrical member 16 is joined, is placed on its bottom provided by the protruding circular portion 13, and the plate member 32 is passed along the central cylindrical member 16. The coolant/filter 7 is then fitted on the outside of the circumferential wall portion of the plate member 32, so that the coolant/filter 7 is positioned by the plate member 32. The space inside the coolant/filter 7 is filled with the solid bodies of the gas generating agent 6, and then covered with the plate member 33. Thereafter, the closure shell 2 is mounted on the plate member 33 by inserting the central cylindrical member 16 through the central aperture 15 of the closure shell 2, and the flange portion 20 of the closure shell 2 is superposed on the flange portion 19 of the diffuser shell 1. In this state, the diffuser shell 1 is joined to the closure shell 2 by laser welding 21, and the closure shell 2 is joined to the central cylindrical member 16 by laser welding 44. In the final step, the transfer charge container 53 and igniter 4 are inserted into the central cylindrical member 16, and a crimped portion 27 of an igniter holding member is crimped to fix the container 53 and igniter 4 in position.

In the present gas generator constructed as described above, when an impact is detected by a sensor (not shown), a signal is transmitted from the sensor to the igniter 4, which is then actuated to ignite or fire the transfer charge 5 in the transfer charge container 53, thereby producing a high-temperature flame. This flame is ejected through the through-holes 54, to ignite the gas generating agent 6 around the through-holes 54, and then directed downward to ignite the gas generating agent 6 located in the lower portion of the combustion chamber. As a result, the gas generating agent 6 burns to produce high-temperature, high-pressure gas, and the combustion gas thus produced passes through the entire region of the coolant/filter 7, where the gas is effectively cooled and the combustion residues are scavenged or entrapped during the passage. The combustion gas thus cooled and purified passes through the gas passage (space 9), and ruptures the aluminum tape 52, to be ejected or expelled through the gas discharge ports 11 and flows into an air bag (not shown). The air bag then inflates to form a cushion between a passenger and a hard structure, thereby protecting the passenger from the impact.

FIG. 2 is a cross sectional view of a gas generator for an air bag according to another embodiment of the present invention. The present gas generator includes a housing 63 including of a diffuser shell 61 and a closure shell 62, an igniter 64 disposed in a storage space within the housing 63, a gas generating agent 66 to be ignited by the igniter 64 to produce combustion gas, and a coolant/filter 67 that defines a combustion chamber 84 for storing the gas generating agent 66.

The diffuser shell 61 is formed by pressing a stainless steel sheet, and has a circular portion 78, a circumferential wall portion 76 formed at the outer periphery of the circular portion 78, and a flange portion 86 formed at the distal end of the circumferential wall portion 76 to extend radially outward from this portion 76. A plurality of gas discharge ports 77 are formed through the circumferential wall portion 76 at regular intervals in the circumferential direction. The circular portion 78 of the diffuser shell 61 has a plurality of rib-like reinforcing portions 79 formed in radial directions. These rib-like reinforcing portions 79 serve to increase the rigidity of the housing, in particular, of the circular portion 78 of the diffuser shell that provides a ceiling portion of the housing, thereby inhibiting the housing from being deformed due to the gas pressure.

The closure shell 62 is formed by pressing a stainless steel sheet, and has a circular portion 71, a circumferential wall portion 72 formed at the outer periphery of the circular portion 71, and a flange portion 87 formed at the distal end of the circumferential wall portion 72 to extend outward from this portion 72. The circular portion 71 has a recessed portion 73 formed with a stepped portion 48 in its central portion, and a central aperture 74 formed through a central part of the recessed portion 73. The central aperture 74 is defined by an axial bent portion 75 formed at the inner periphery of the closure shell 62. The bent portion 75 has an inner circumferential surface 81 in which a barrel portion 80 of the igniter is fitted, and an end face 83 that engages with a mounting portion 82 of the igniter. The inner circumferential surface 81 of the axial bent portion 75 provides a relatively large area for sealing the interior of the housing. To ensure the air-tightness of the housing, a sealing material may fill an interface between the barrel portion 80 of the igniter and the inner circumferential surface 81 of the bent portion 75, or the mounting portion 82 of the igniter may be welded to the end face 83 of the bent portion 75. The end face 83 engaging with the mounting portion 82 of the igniter serves to prevent the igniter 64 from being pulled out of the housing due to the gas pressure in the combustion chamber 84. The stepped portion 48 of the closure shell 62 increases the rigidity of the housing, in particular, of the circular portion 71 that provides a bottom portion of the housing. With the recessed portion 73 formed as described above, a connector bottom face 85 of the igniter is positioned inwardly of the outer surface of the circular portion 71. The bent portion 75 serves to increase the rigidity of the peripheral portion of the central aperture 74.

The housing 63 is formed by superposing the flange portion 86 of the diffuser shell 61 and the flange portion 87 of the closure shell 62 on each other at an axially middle position of the housing 63, and subjecting it to a laser beam welding 88, thus joining the diffuser shell 61 and closure shell 62. These flange portions 86, 87 serve to increase the rigidity of the outer circumferential wall 68 of the housing, thereby preventing deformation of the housing due to the pressure of the generated gas.

The igniter 64 includes a generally used electric igniter adapted to be actuated in response to a signal from a sensor (not shown). The electric igniter is more preferable than a mechanical igniter, since it has a simplified structure with no mechanical arrangement, and has reduced size and weight. In the present embodiment, the igniter 64 (its output is 300 to 1500 psi in a closed pressure vessel of 10 cc) is not accompanied by the transfer charge container 53 as shown in FIG. 1 or the like, because the gas generating agent 66 has good ignition and combustion characteristics. The gas generating agent 66 has a hollow, cylindrical shape, which is advantageous in that combustion takes place at its outer surface and inner surface, and the overall surface area of the gas generating agent 66 does not significantly change as the combustion progresses.

The coolant/filter 67 is disposed concentrically with the central aperture 74, and cooperates with the housing 63 to define the combustion chamber 84. This coolant/filter 67 is formed by superposing some layers of plain-stitch wire screens made of stainless steel in the radial direction, and compressing the wire screens in the radial direction and axial direction. The coolant/filter 67 defining the combustion chamber 84 serves to cool combustion gas generated in the combustion chamber 84, and scavenge or entrap combustion residues. An outer layer 89 having a layered wire net structure is formed outside the coolant/filter 67, and serves to reinforce the coolant/filter and cool the combustion gas.

The closure shell 62 formed by press working includes an inclined portion 90 formed in the circumferential direction to surround its circular portion 71. This inclined portion 90 serves to position the coolant/filter 67 and inhibit radial movement of the coolant/filter 67, and also serves as means for forming a space 69 between the outer circumferential wall 68 of the housing 63 and the outer layer 89 of the coolant/filter 67.

A large number of solid bodies of gas generating agent 66 each having a hollow cylindrical shape are provided in the combustion chamber 84. The bodies of gas generating agent 66 are directly loaded in the space inside the combustion chamber 84, to be disposed adjacent to the igniter 64, and their movements are limited by a circular portion 92 of a plate member 91 that closes an opening 45 defined by one end portion of the coolant/filter 67. The plate member 91 has the circular portion 92, and a circumferential wall portion 93 formed integrally with the circular portion 92, which abuts on an inner circumferential surface of the above-indicated one end portion of the coolant/filter 67 to cover the inner circumferential surface. The plate member 91 prevents the combustion gas from short-passing through a clearance between one end face 94 of the coolant/filter and the circular portion 78 of the diffuser shell. The other end face 95 of the coolant/filter 67 at which the plate member 91 is not provided, is fixed to the inner face 46 of the housing by welding, thereby to prevent the combustion gas from passing along the other end face 95. With the end face 95 of the coolant/filter welded to the inner face 46 of the hosing, a packing formed of silicon rubber or the like and having flame resistance and resiliency need not be provided between the end face 95 of the coolant/filter and the inner face 46 of the housing.

The space 69 is formed between the outer circumferential wall 68 of the housing and the outer layer 89 of the coolant/filter 67, to form an annular gas passage around the coolant/filter 67, as viewed in a radial cross section. As in the gas generator shown in FIG. 1, the area of the gas passage as measured in the radial cross section is made larger than the total opening area of the gas discharge ports 77 of the diffuser shell. By the presence of the gas passage around the coolant/filter 67, the combustion gas passes through the entire region of the coolant/filter 67, to be directed toward the gas passage, thereby achieving efficient use of the coolant/filter 67 and effective cooling and purification of the combustion gas. The combustion gas thus cooled and purified by the coolant/filter 67 reaches the gas discharge ports 77 of the diffuser shell 61, through the gas passage as described above. An aluminum tape 96 is attached to the inside of the housing to close the gas discharge ports 77 of the diffuser shell.

In the gas generator of the present embodiment, the ratio (A/At) of A to At is controlled to be in the range of 450 to 1000, as in the gas generator of FIG. 1, where A is the total surface area of the solid bodies of gas generating agent 66, and At is the total opening area of the gas discharge ports 77 of the diffuser shell 61. With the ratio A/At thus controlled, the burning velocity of the gas generating agent is controlled to be suited for an air bag installed on the side of a driver seat, and the gas generating agent provided in the present gas generator can be completely burned within a desired period of time. Also, the present gas generator is less likely to be influenced by changes in the temperature of the atmosphere, thus assuring stable operating characteristics.

In assembling the gas generator of the present embodiment, the closure shell 62 is placed such that its circular portion 71 is placed at the bottom, and the igniter 64 is disposed in the central aperture 74. Then the coolant/filter 67 is disposed on the closure shell 62, and the inner space of the coolant/filter 67 is filled with the gas generating agent 66, and then covered with the plate member 91. Finally, the flange portion 86 of the diffuser shell and the flange portion 87 of the closure shell are superposed on each other, and subjected to laser welding 88, so that the diffuser shell 61 and closure shell 62 are joined together.

In the present gas generator constructed as described above, when an impact is detected by a sensor (not shown), a signal is transmitted from the sensor to the igniter 64, which is then actuated to ignite the gas generating agent 66 in the combustion chamber 84. As a result, the gas generating agent 6 burns to produce high-temperature, high-pressure gas, and the combustion gas thus produced passes through the entire region of the coolant/filter 67, where the gas is effectively cooled and the combustion residues are scavenged or entrapped during the passage. The combustion gas thus cooled and purified passes through the gas passage provided by the space 69, and ruptures the aluminum tape 96, to be ejected through the gas discharge ports 77 and flow into an air bag (not shown). The air bag then inflates to form a cushion between a passenger and a hard structure, thereby to protect the passenger from the impact.

Figure 3:
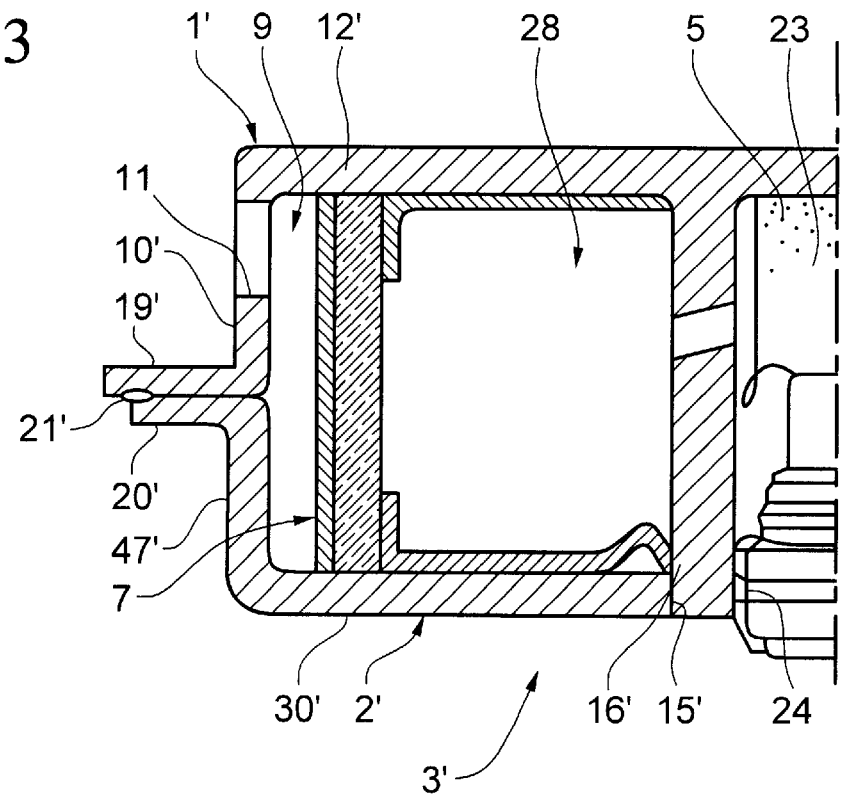
FIG. 3 is a cross sectional view of one half of a gas generator according to yet another embodiment of the present invention.

FIG. 3 shows an example of a gas generator, which is similar to that of FIG. 1, wherein a diffuser shell 1' and a closure shell 2' are formed by casting, using an aluminum alloy. The diffuser shell 1' has a circular portion 12', a central cylindrical portion 16' formed integrally with the circular portion 12', a circumferential wall portion 10' formed at the outer periphery of the circular portion 12', and a flange portion 19' formed at the distal end of the circumferential wall portion 10' to extend radially outward from this portion 10'. The closure shell 2' has a circular portion 30', a central aperture 15' formed through a middle part of the circular portion 30', a circumferential wall portion 47' formed at the outer periphery of the circular portion 30', and a flange portion 20' formed at the distal end of the circumferential wall portion 47' to extend radially outward from this portion 47'. The central cylindrical portion 16' of the diffuser shell is fitted in the central aperture 15' of the closure shell. The flange portion 19' of the diffuser shell and the flange portion 20' of the closure shell are superposed on each other, and subjected to laser welding 21', so that the diffuser shell 1' and closure shell 2' are joined together to form a housing 3'. In FIG. 3, the same reference numerals as used in FIG. 1 are used to identify the same elements and detailed description thereof are omitted.

Figure 4:
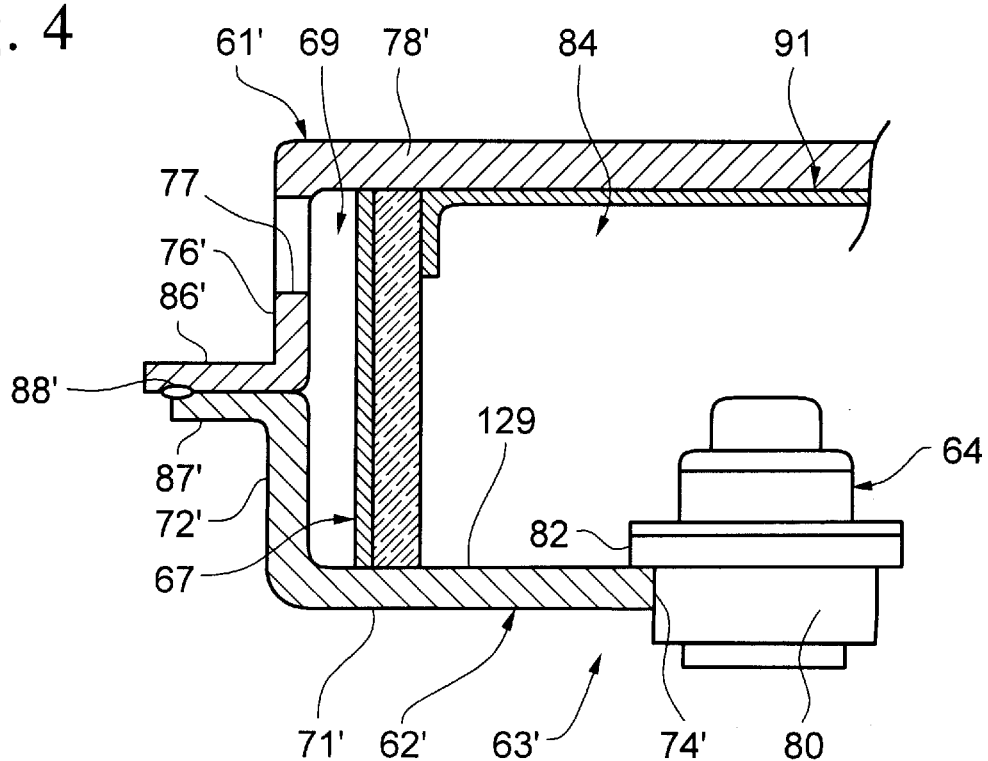
FIG. 4 is a cross sectional view of one half of a gas generator according to a still another embodiment of the present invention.

FIG. 4 shows an example of a gas generator, which is similar to that of FIG. 2, having a diffuser shell 61' and a closure shell 62' formed by casting, using an aluminum alloy. The diffuser shell 61' has a circular portion 78', a circumferential wall portion 76' formed at the outer periphery of the circular portion 78', and a flange portion 86' formed at the distal end of the circumferential wall portion 76' to extend radially outward from this portion 76'. The closure shell 62' has a circular portion 71', a circumferential wall portion 72' formed at the outer periphery of the circular portion 71', and a flange portion 87' formed at the distal end of the circumferential wall portion 72' to extend radially outward from this portion 72'. A central aperture 74' is formed through a middle part of the circular portion 71'. The barrel portion 80 of the igniter 64 is fitted in the central aperture 74' of the closure shell 62', and the mounting portion 82 of the igniter 64 engages with an inner surface 129 of the circular portion 71' of the closure shell 62'. The flange portion 86' of the diffuser shell and the flange portion 87' of the closure shell are superposed on each other, and subjected to laser welding 88, so that the diffuser shell 61' and closure shell 62' are joined together to form a housing 63'. In FIG. 4, the same reference numerals as used in FIG. 2 are used to identify the same elements and detailed description thereof are omitted.

Figure 5:
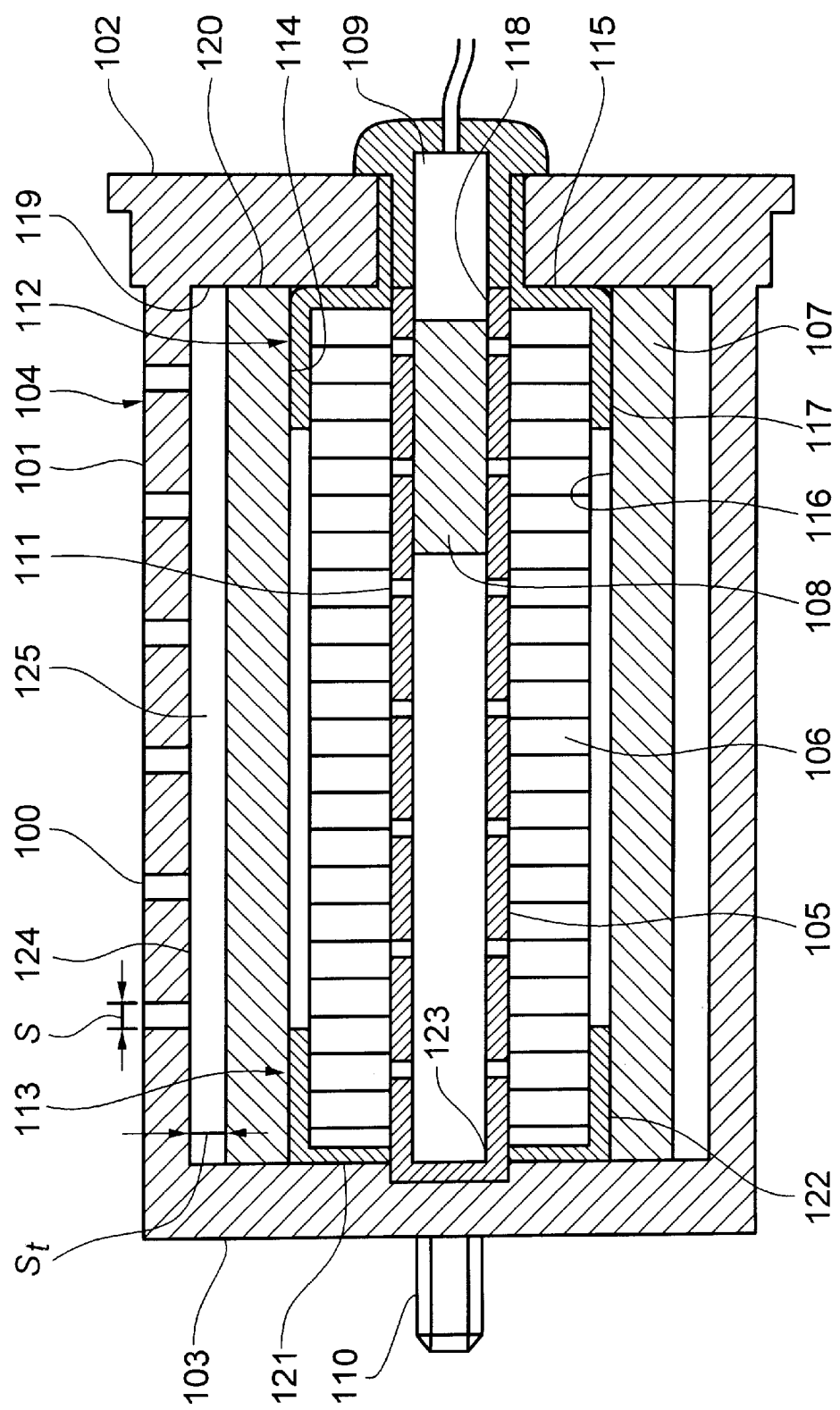
FIG. 5 is a cross sectional view showing a gas generator of the present invention suitable for an air bag system for a passenger seat.

FIG. 5 shows a gas generator for an air bag to be used on the side of a passenger seat. This gas generator has a housing 104 having a cylindrical portion 101 and side wall portions 102, 103 provided at the opposite ends of the cylindrical portion 101. A plurality of gas discharge ports 100 are formed through the cylindrical portion 101 such that they are arranged in its circumferential and axial directions. A transfer tube 105 is provided in a central portion of the housing 104, and a plurality of discs of gas generating agent 106 are arranged in parallel with each other to fit on the outer surface of the transfer tube 105. Further, a coolant/filter 107 is provided such that it surround the gas generating agents 106. Igniting means comprising a transfer charge 108 and an igniter 109, is provided at one of the side wall portions 102, and is accommodated in the transfer tube 105. A screw bolt 110 for attaching the inflator to a vehicle is fixed to the other side wall portion 103. The transfer tube 105 is provided with a large number of openings 111 through which a flame generated by the transfer charge 108 is ejected, such that the openings 111 are formed through the cylindrical wall of the transfer tube 105 at regular intervals. An aluminum tape 124 is secured to the inner surface of the housing 104 to cover at least a region of the housing 104 where the gas discharge ports 100 are formed. This aluminum tape 124 air-tightly closes the discharge ports 100, to prevent entry of moisture from the exterior space into the housing through the discharge ports 100.

Plate members 112, 113 are respectively provided at right-hand and left-hand end portions of the coolant/filter 107 as viewed in FIG. 5. The plate member 112 consists of a circular portion 115 for closing an opening 144 at the right-hand end portion of the coolant/filter 107, and a circumferential wall portion 117 formed integrally with the circular portion 115 and abutting on an inner circumferential surface 116 of the coolant/filter 107. The circular portion 115 has a central aperture 118 in which the transfer tube 105 is fitted. The plate member 113 has a circular portion 121, a circumferential wall portion 122, and a central aperture 123, which are similar to those of the plate member 112. These plate members 112, 113 are fixed to the transfer tube 105 such that radial movements of these members 112, 113 are limited or restricted by the tube 105, and thus serve to position the coolant/filter 107 during assembly of the gas generator. The plate members 112, 113 also serve as means for inhibiting movement of the coolant/filter 107 due to vibrations of the vehicle, and as short-pass preventing means for preventing combustion gas from short-passing through a clearance between the inner surface 119 of the housing and an end face 120 of the coolant/filter upon actuation of the gas generator.

A space 125 is formed between the cylindrical portion 101 of the housing and the coolant/filter 107. With the space 125 thus provided, an annular gas passage, as viewed in a radial cross section, is formed around the coolant/filter 107. The area St of the gas passage, as measured in the radial cross section, is made lager than the sum At of opening areas S of the gas discharge ports 100 of the cylindrical portion. By the presence of the gas passage, the combustion gas passes through the entire region of the coolant/filter, to be directed toward the gas passage, thereby achieving efficient use of the coolant/filter and effective cooling and purification of the combustion gas. The combustion gas thus cooled and purified by the coolant/filter 107 reaches the gas discharge ports 100 of the cylindrical portion of the housing, through the gas passage as described above.

In the present gas generator, the ratio A/At is controlled to be in the range of 450 to 1000 where A is the total surface area of the gas generating discs 106, and At is the total opening area of the gas discharge ports 100 of the cylindrical portion. In this embodiment, where 32 gas discharge ports having an inside diameter of 3 mm are formed, the sum At of their opening areas is 226 $mm^2$, and where the housing is filled with 100 g of gas generating agent as shown in FIG. 1, the sum A of the surface areas thereof is 153524 $mm^2$, resulting in a ratio A/At of 679. With the ratio A/At thus controlled, the burning velocity of the gas generating agent is controlled to be suited for an air bag to be used on the side of a passenger seat, and the gas generating agent provided in the present gas generator can be completely burned within a desired period of time. Also, the present gas generator is less likely to be influenced by the temperature of the outside atmosphere, thus assuring stable operating characteristics.

When an impact is detected by a sensor, a signal is transmitted from the sensor to the igniter 109, which is then actuated to ignite or fire the transfer charge 108 to generate a high-temperature flame. The flame is ejected through the openings ill of the transfer tube 105, and ignites the gas generating discs 106 provided around the openings 111. As a result, the gas generating agent 106 burns to produce high-temperature, high-pressure combustion gas. The combustion gas thus produced passes through the entire region of the coolant/filter 107, where the gas is effectively cooled and the combustion residues are scavenged or entrapped during the passage. The combustion gas thus cooled and purified passes through the gas passage (space 125), and ruptures the aluminum tape 124, and ejected through the gas discharge ports 100 and flow into an air bag (not shown). The air bag then inflates and forms a cushion between a passenger and a hard structure, thereby protecting the passenger from the impact.

Figure 6:
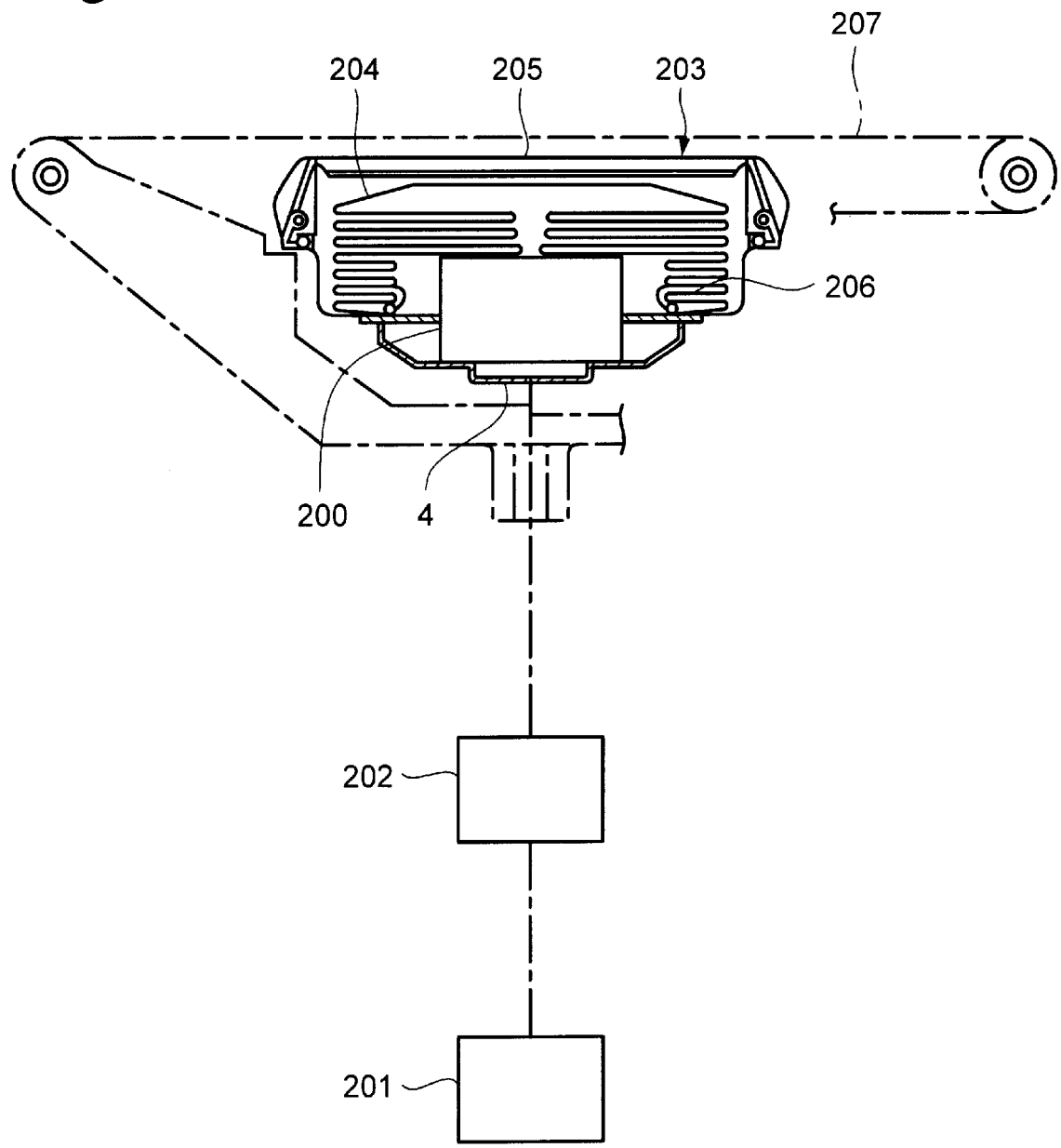
FIG. 6 is a view showing the construction of an air bag system of the present invention.

FIG. 6 shows an example of an air bag system having the gas generator of the present invention. This air bag system includes a gas generator 200, an impact sensor 201, a control unit 202, a module case 203, and an air bag 204.

The gas generator explained above with reference to FIG. 1 is used as the gas generator 200.

The impact sensor 201 may be of a semiconductor type acceleration sensor, for example. In this semiconductor type acceleration sensor, four semiconductor strain gauges are formed on a beam of a silicon substrate that is adapted to deflect upon application of acceleration, such that these strain gauges are connected in a bridge form. The beam is deflected upon application of acceleration thereto, and strains occur on the surface of the beam. The resistance of the semiconductor strain gauges changes due to the strains, and the changes in the resistance are detected as voltage signals that are proportional to the applied acceleration.

The control unit 202 includes an ignition determining circuit, which receives signals from the semiconductor type acceleration sensor. At the point of time when the impact signal from the impact sensor exceeds a predetermined value, the control unit 202 starts computing, and generates an actuation signal to the igniter 4 of the gas generator 200 when the result of computing exceeds a predetermined value.

The module case 203 is formed of polyurethane, for example, and includes a module cover 205. The air bag 204 and the gas generator 200 are accommodated in the module case 203, to thereby provide a pad module which is attached to a steering wheel 207 of an automobile.

The air bag 204 is formed of nylon (nylon 66, for example), polyester or other material, and fixed to the flange portion of the gas generator as it is folded, with its opening 206 surrounding the gas discharge ports of the gas generator.

When the semiconductor type acceleration sensor 201 detects an impact upon crash of the automobile, an output signal of the sensor 201 is transmitted to the control unit 202, and the control unit 202 starts computing at the point of time when the impact signal from the sensor exceeds the above predetermined value. The control unit 202 then generates an actuation signal to the igniter 4 of the gas generator 200 when the result of computing exceeds the above predetermined value. As a result, the igniter 4 is actuated to ignite the gas generating agent, so that the gas generating agent burns to produce combustion gas. The gas thus generated is expelled into the air bag 204, to inflate the air bag 204 while breaking the module cover 205, so that the inflated air bag 204 forms a cushion between the steering wheel 207 and the passenger to absorb the impact.

In the gas generator of the present invention constructed as described above, the gas generating agent provided in the gas generator can be completely burned within a desired period of time, and the maximum pressure in the housing upon actuation of the gas generator is unlikely to be influenced by changes in the temperature of the atmosphere, thereby assuring stable operating characteristics of the gas generator.

EXAMPLE

Tank Pressure Test

Figure 7:
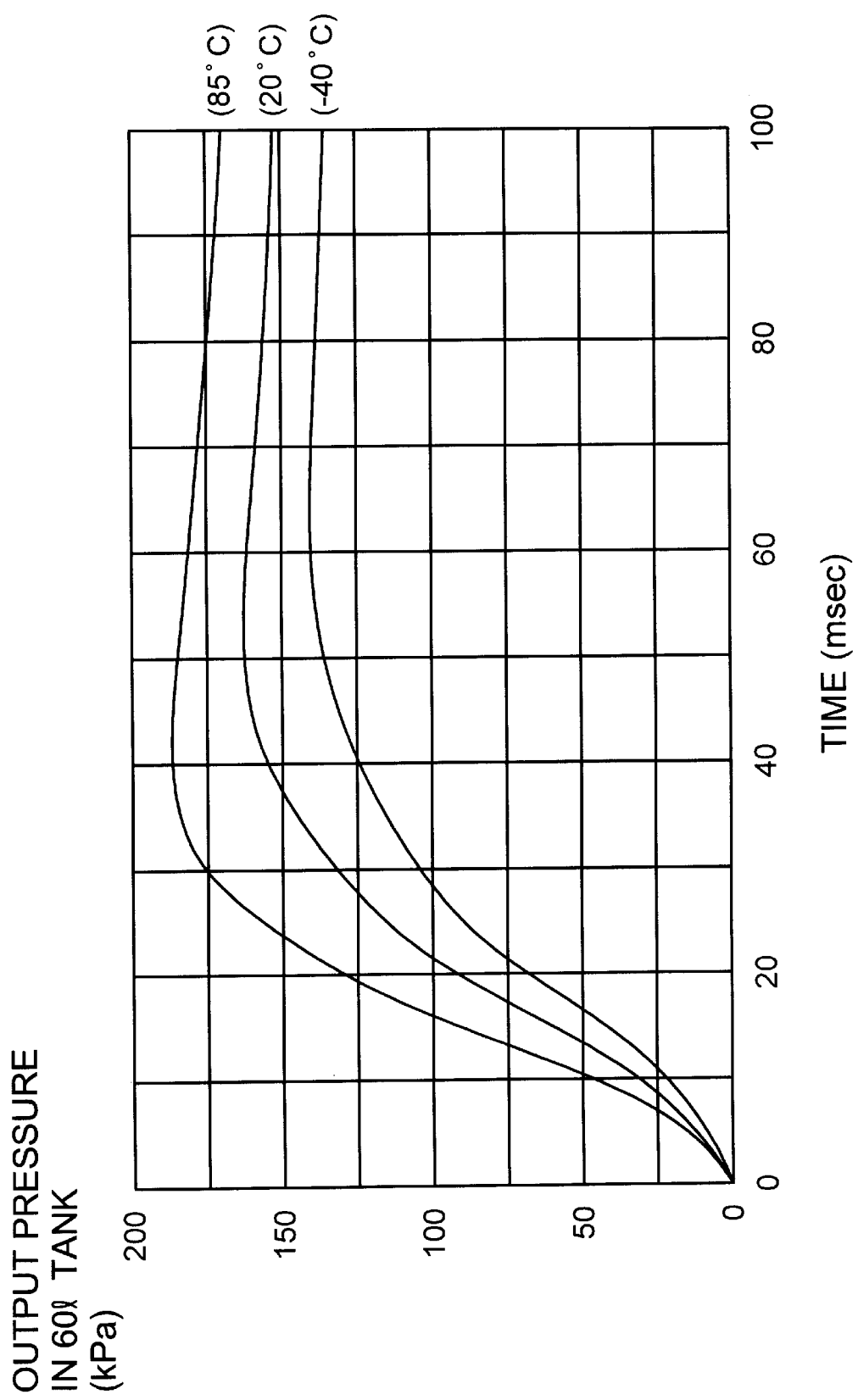
FIG. 7 is a graph showing results of tank pressure tests.

Tank pressure tests were conducted at 85° C., 20° C. and −40° C., using a gas generator in which the total surface area A of solid bodies of gas generating agent and the total opening area At of gas discharge ports are controlled to respective values as indicated below. The results of the tests are shown in FIG. 7.

Gas generator

The total opening area At of gas discharge ports (16 gas discharge ports each having an inside diameter of 3.0 mm) was 113 mm².

Gas generating agent

Each pellet of the gas generating agent having a hollow cylindrical shape had an outside diameter 2.35 mm, inside diameter of 0.69 mm and a length of 3.0 mm.

Linear burning velocity: 11 mm/sec

The total surface area A of the pellets of the gas generating agent was 56804 mm² (37 g).

The ratio (A/At) of the total surface area A of the gas generating pellets to the total opening area At of the gas discharge ports was 502.

Evaluation

The evaluation on the results of the tank pressure tests shown in FIG. 7 indicates that where A/At is equal to 502 as in the above example, a difference between the maximum pressures in the tank at 85° C. and 20° C. is about 30 kPa, and a difference between the maximum pressures in the tank at 20° C. and −40° C. is about 20 kPa. Thus, the differences between the maximum tank pressures at 85° C. and 20° C., and at 20° C. and −20° C. are smaller than 40 kPa, which means that operating characteristics of the gas generator are less likely to be influenced by changes in the temperature of the atmosphere.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A gas generator for an air bag, comprising:
   a housing having at least one gas discharge port;
   igniting means that is actuated when an impact sensor detects an impact;
   solid bodies of gas generating agent that are ignited by the igniting means and burned to generate a combustion gas; and
   coolant-filter means for cooling the combustion gas and scavenging combustion residues, said igniting means, said gas generating agent and said filter means being accommodated in said housing, wherein
   a ratio (A/At) of a total surface area A of said solid bodies of gas generating agent to a total opening area At of said at least one gas discharge port is limited to be larger than 300.

2. A gas generator for an air bag according to claim 1, wherein
   a difference between maximum pressures at 85° C. and 20° C. and a difference between maximum pressures at 20° C. and −40° C. obtained in tank pressure tests are respectively not higher than 40 kPa.

3. A gas generator for an air bag according to claim 1, wherein said gas generator is used for at least one of a driver side and a passenger side, and, said ratio (A/At) is larger than 300 and not larger than 1300.

4. A gas generator for an air bag according to claim 1, wherein said gas generator is used for at least one of a driver side and a passenger side, and said ratio (A/At) is in a range of 450 to 1300.

5. A gas generator for an air bag according to claim 1, wherein said gas generator is used for at least one of a driver side and a passenger side, and said ratio (A/At) is in a range of 450 to 1000.

6. A gas generator for an air bag according to claim 1, wherein the total opening area At of said at least one gas discharge port is in a range of 50 to 200 mm² where the gas generator is used for an air bag for a driver side, and is in a range of 60 to 500 mm² where the gas generator is used for an air bag for a passenger side.

7. A gas generator for an air bag according to claim 1, wherein the total surface area A of said solid bodies of gas generating agent is in a range of $4 \times 10^4$ to $7 \times 10^4$ mm² where the gas generator is used for an air bag for a driver side, and is in a range of $6 \times 10^4$ to $3 \times 10^5$ mm² where the gas generator is used for an air bag for a passenger side.

8. A gas generator for an air bag according to claim 1, wherein each of said at least one discharge port has an inside diameter of 2 to 5 mm.

9. A gas generator for an air bag according to claim 1, wherein said housing has a volume content of 60 to 130 cc.

10. A gas generator for an air bag according to claim 1, wherein said solid bodies of gas generating agent have a linear burning velocity of 7 to 30 mm/sec under a pressure of 70 kg/cm².

11. A gas generator for an air bag according to claim 1, wherein said solid bodies of gas generating agent have a linear burning velocity of 7 to 15 mm/sec under a pressure of 70 kg/cm$^2$.

12. A gas generator for an air bag according to claim 1, said gas generating agent is a non-azide gas generating agent containing a nitrogen containing organic compound, an oxidizing agent, and a slag-forming agent.

13. A gas generator for an air bag according to claim 12, wherein said gas generating agent contains 25 to 60% by weight of the nitrogen containing organic compound, 40 to 65% by weight of the oxidizing agent, and 1 to 20% by weight of the slag-forming agent.

14. A gas generator for an air bag according to claim 12, wherein the nitrogen containing organic compound is nitroguanidine.

15. A gas generator for an air bag according to claim 12, wherein the slag-forming agent is acid clay.

16. A gas generator for an air bag according to claim 1, wherein each of said solid bodies of gas generating agent is formed into a cylindrical shape having a single hole.

17. A gas generator for an air bag according to claim 1, wherein an amount of said gas generating agent loaded in the gas generator is in a range of 20 to 50 g where the gas generator is to be used for an air bag for a driver side, and in a range of 50 to 190 g where the gas generator is to be used for an air bag for a passenger side.

18. An air bag system comprising:

a gas generator for an air bag, an impact sensor that actuates the gas generator upon detection of an impact;

an air bag which is inflated by a gas generated by said gas generator and introduced into the air bag; and a module case that stores said air bag, said air bag system, wherein said gas generator for an air bag is the gas generator for an air bag as defined in claim 1.

19. A gas generator for an air bag according to claim 1, wherein said gas generating agent is a non-azide gas generating agent.

20. A gas generator for an air bag according to claim 1, wherein said gas generating agent is completely burned in a period of time of about 40 to 60 msec when the gas generator is used for a driver side.

21. A gas generator for an air bag according to claim 1, wherein said gas generating agent is completely burned in a period of time of about 50 to 80 msec when the gas generator is used for a passenger side.

* * * * *